(12) United States Patent
Zhang et al.

(10) Patent No.: US 12,038,270 B2
(45) Date of Patent: Jul. 16, 2024

(54) SHEAROGRAPHY TESTING METHOD AND SYSTEM USING SHAPED EXCITATION LIGHT HAVING AT LEAST ONE CURVED LINE

(71) Applicant: AGENCY FOR SCIENCE, TECHNOLOGY AND RESEARCH, Singapore (SG)

(72) Inventors: Lei Zhang, Singapore (SG); Weng Heng Liew, Singapore (SG); Huajun Liu, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 156 days.

(21) Appl. No.: 17/436,685

(22) PCT Filed: Mar. 26, 2020

(86) PCT No.: PCT/SG2020/050167
§ 371 (c)(1),
(2) Date: Sep. 7, 2021

(87) PCT Pub. No.: WO2020/204817
PCT Pub. Date: Oct. 8, 2020

(65) Prior Publication Data
US 2022/0146252 A1 May 12, 2022

(30) Foreign Application Priority Data
Mar. 29, 2019 (SG) .......................... 10201902897Y

(51) Int. Cl.
*G01B 11/16* (2006.01)

(52) U.S. Cl.
CPC .......... *G01B 11/162* (2013.01); *G01B 11/167* (2013.01)

(58) Field of Classification Search
CPC .............. G01B 11/162; G01B 9/02098; G01B 11/167; G01L 1/103; G01N 2291/0231;
(Continued)

(56) References Cited

U.S. PATENT DOCUMENTS 4,581,939 A * 4/1986 Takahashi .......... G01N 29/2418
356/432
5,146,289 A 9/1992 Newman
(Continued)

FOREIGN PATENT DOCUMENTS

WO WO-2019030751 A1 * 2/2019 ......... G01B 9/02094
WO WO-2020/031181 A1 2/2020

OTHER PUBLICATIONS

Written Opinion in SG Application No. 11202108907X dated Dec. 5, 2022, 9 pages.
(Continued)

*Primary Examiner* — Michael P LaPage
(74) *Attorney, Agent, or Firm* — MARSHALL, GERSTEIN & BORUN LLP

(57) ABSTRACT

A non-contact non-destructive testing method includes spatially and/or temporally controlling a laser excitation light based on a predetermined pattern. The laser excitation light is projected onto a surface of a test object to generate acoustic waves on the test object. The acoustic waves apply stress loading to the test object. The method also includes imaging the test object with and without stress loading using shearography imaging, and analyzing shearography imaging data to determine a presence of a defect in the test object.

12 Claims, 5 Drawing Sheets

(58) Field of Classification Search
CPC ... G01N 2291/0234; G01N 2291/2632; G01N 2291/2694; G01N 29/069; G01N 29/241; G01N 29/341
See application file for complete search history.

(56) References Cited

U.S. PATENT DOCUMENTS

| | | | | |
|---|---|---|---|---|
| 5,481,356 | A | * | 1/1996 | Pouet .................. G01B 11/162 356/450 |
| 5,546,187 | A | * | 8/1996 | Pepper .................. G01H 9/002 356/502 |
| 5,585,921 | A | * | 12/1996 | Pepper ................ G01N 29/075 356/432 |
| 5,796,004 | A | | 8/1998 | Nakaso et al. |
| 7,262,861 | B1 | | 8/2007 | Pepper et al. |
| 9,250,213 | B1 | | 2/2016 | Bossi et al. |
| 2014/0172399 | A1 | | 6/2014 | Ume et al. |
| 2014/0247456 | A1 | | 9/2014 | Horstmann et al. |
| 2016/0265900 | A1 | * | 9/2016 | Yang .................... G01B 11/162 |
| 2020/0371018 | A1 | * | 11/2020 | Leizerson .......... G01B 9/02094 |
| 2021/0116358 | A1 | * | 4/2021 | Leizerson ............... G06T 7/001 |

OTHER PUBLICATIONS

Search Report and Written Opinion in International Application No. PCT/SG2020/050167 dated Aug. 3, 2020, 11 pages.

* cited by examiner

SHEAROGRAPHY TESTING METHOD AND SYSTEM USING SHAPED EXCITATION LIGHT HAVING AT LEAST ONE CURVED LINE

TECHNICAL FIELD

The present disclosure relates broadly, but not exclusively, to non-destructive testing methods and systems.

BACKGROUND

Non-destructive testing (NDT) refers to methods of evaluating material or structural integrity without damaging the test objects, or degrading their functions. NDT methods are widely used in manufacturing and in-service inspection to ensure the quality of products, reliability of production lines and safety of built structures. The in-service inspections with NDT methods are necessary in industries such as aerospace, automobile, marine and offshore industries where failure of components would incur great losses for life and assets with disastrous social, economic and environmental impacts.

There are a variety of NDT methods to evaluate materials and components, including acoustic testing or imaging, electromagnetic testing, X-ray imaging, and laser testing. Acoustic testing or imaging methods typically utilize acoustic waves, usually at a high frequency in the ultrasound range, to probe the internal structural defects of test object. Although acoustic methods can offer high penetration depth and good resolution of defects, the limited detection range of a single measurement and the long time required for large area imaging have constrained their applications.

Electromagnetic testing methods such as eddy-current testing are performed by inducing an eddy current within an electrically conductive test object using an alternating magnetic field. The presence of defects within the test object can be detected by observing the change in the eddy current. However, the applications of electromagnetic testing methods are limited to metallic or electrically conductive materials.

X-ray imaging methods such as computed tomography (CT) can offer sophisticated three dimensional images of the test object. However, the radiation hazard and the high cost of X-ray have discouraged frequent applications of the X-ray imaging methods for regular NDT inspections.

Shearography is an optical measurement technique for NDT, offering full-field large area inspection with fast acquisition rate. Defect detection in shearography is typically performed by comparing the speckle patterns of the test object acquired by a charge coupled device (CCD) sensor under loaded and unloaded states. Hence, the strong interaction between defects and the applied load is usually critical to achieve high defect detection rate. Various loading methods, such as excitations with vacuum, vibration, thermal and acoustic waves, have been demonstrated to induce the loaded state for shearography imaging. These loading methods usually require physical contact between the loading sources and the test object. Such contact-mode operations not only may limit the field of view in a shearography test but also limit the applications of shearography testing in situations where physical contact cannot be established due to complex structures or environment conditions such as high temperatures.

Laser loading methods have been applied in shearography by illuminating the surface of test object using a diffused laser beam as a thermal loading. The surface illuminated by the laser beam will be heated up and generate surface deformation anomalies due to thermal expansion, which is similar to the thermal-loaded shearography. However, the thermal loading using diffused laser can suffer from poor signal strength and low sensitivity due to the low energy density of the diffused laser resulting in limited penetration depth and only surface defects are detectable.

A need therefore exists to provide non-destructive testing methods and systems that can address at least some of the above problems.

SUMMARY

To overcome the limitations of existing NDT methods, the present disclosure provides a non-contact laser acoustic shearography method and system. The present method and system effectively combine the advantages of non-contact laser loading, high penetration depth of acoustic waves, and full-field and fast acquisition rate of shearography imaging.

Embodiments of the present disclosure provide a laser acoustic shearography system comprising patterned laser pulses as an excitation source and a full-field shearography imaging system including an illuminating laser light source, interferometry optics and an image recording device, and a method of applying this system for non-contact non-destructive testing of defects in materials and structures.

High-power laser pulse is directed on the surface of the test object to induce acoustic waves in the test object. The geometrical shape of the projected laser pulse can be a continuous straight line on the surface of the test object to produce a steerable and directional acoustic wave in the test object. The geometrical shape of the projected laser pulse can also be a continuous curved line to produce a focused acoustic wave to the desired area in the test object. A plurality of laser pulses can be focused on the test object simultaneously forming multiple points with certain patterns to produce the steerable and directional or focused acoustic wave in the test object. A plurality of laser pulses can also be focused on the test object with a time delay between the pulses to produce the steerable directional or focused acoustic wave in the test object. A plurality of laser pulses can be projected on the test object forming multiple straight or curved lines or enclosed line shapes. The interval/gap between the straight or curved lines matches the wavelength of the induced acoustic waves in test object, resulting in increased intensity and directionality of the acoustic waves. The patterned pulsed lasers can also be projected over one or multiple pre-defined areas of the test object to induce acoustic waves in the test object. The patterned pulse lasers projected to these defined areas can be excited simultaneously or with a pre-defined time sequence.

The acoustic waves induced by the patterned laser pulses interact with surface or subsurface defects to generate surface deformation anomalies in the test object. The shearography imaging system captures the surface deformation anomalies by comparing interferometric images of the test object under a loaded state of acoustic wave excitation with that of an unloaded state. Large area, non-contact and non-destructive inspection of defects can be performed by steering the laser pulses across the test object.

An aspect of the present disclosure provides a non-contact non-destructive testing method comprising:

spatially and/or temporally controlling a laser excitation light based on a predetermined pattern;

projecting the laser excitation light onto a surface of a test object to generate acoustic waves on the test object, the acoustic wave applying stress loading to the test object;

imaging the test object with and without stress loading using shearography imaging; and analyzing shearography imaging data to determine a presence of a defect in the test object.

Spatially controlling the laser excitation light may comprise shaping the laser excitation light into a geometric pattern comprising at least one continuous straight line for generating directional acoustic waves.

The method may further comprise rotating the at least one continuous straight line to steer the acoustic waves.

The geometric pattern may comprise a plurality of straight lines, and a gap between adjacent straight lines may be selected based on a wavelength of the acoustic waves to be generated.

Spatially controlling the laser excitation light may comprise shaping the laser excitation light into a geometric pattern comprising at least one continuous curved line for generating focused acoustic waves, and a focus point of the acoustic waves may coincide with the focus point of a curvature of the at least one continuous curved line.

The geometric pattern may comprise a plurality of curved lines, and a gap between adjacent curved lines may be selected based on a wavelength of the acoustic waves to be generated.

Spatially controlling the laser excitation light may comprise shaping the laser excitation light into a geometric pattern comprising at least one enclosed line shape for generating focused acoustic waves.

The geometric pattern may comprise a plurality of enclosed line shapes, and a gap between adjacent enclosed line shapes may be selected based on a wavelength of the acoustic waves to be generated.

The at least one enclosed line shape may comprise one of a group consisting of a circle, a polygon, and an oval.

Spatially controlling the laser excitation light may comprise shaping the laser excitation light into a geometric pattern comprising a dotted line, the dotted line being selected from a group consisting of a dotted straight line, a dotted curved line, and a dotted enclosed line shape.

The method may further comprise projecting the laser excitation light onto a plurality of locations on the surface of the test object and determining the presence of a defect in a corresponding plurality of regions of the test object.

The laser excitation light may be generated from at least one pulsed laser, and temporally controlling the laser excitation light may comprise selecting a pulse duration of the at least one pulsed laser based on a material of the test object and/or a frequency of the acoustic waves.

The laser excitation light may be generated from a plurality of pulsed lasers, and temporally controlling the laser excitation light may further comprise synchronizing the plurality of pulsed lasers to emit simultaneously.

The laser excitation light may be generated from a plurality of pulsed lasers, and temporally controlling the laser excitation light may further comprise controlling the plurality of pulsed lasers to emit sequentially based on predetermined time delays.

Imaging the test object may comprise:

illuminating a region on the surface of test object with a laser illumination light;

for each loading state, recording a respective interferometric speckle pattern generated by reflected laser illumination light using an image sensor.

Another aspect of the present disclosure provides a non-contact non-destructive testing system comprising:

an excitation light source configured to spatially and/or temporally control a laser excitation light based on a predetermined pattern, and project the laser excitation light onto a surface of a test object to generate acoustic waves on the test object, wherein the acoustic waves apply stress loading to the test object; and a shearography imaging system configured to image the test object with and without stress loading, and analyze shearography imaging data to determine a presence of a defect in the test object.

The excitation light source may be configured to spatially shape the laser excitation light into a geometric pattern comprising at least one continuous straight line for generating directional acoustic waves.

The excitation light source may be further configured to rotate the at least one continuous straight line to steer the acoustic waves.

The geometric pattern may comprise a plurality of straight lines, and a gap between adjacent straight lines may be selected based on a wavelength of the acoustic waves to be generated.

The excitation light source may be configured to spatially shape the laser excitation light into a geometric pattern comprising at least one continuous curved line for generating focused acoustic waves, and a focus point of the acoustic waves may coincide with the focus point of a curvature of the at least one continuous curved line.

The geometric pattern may comprise a plurality of curved lines, and a gap between adjacent curved lines may be selected based on a wavelength of the acoustic waves to be generated.

The excitation light source may be configured to spatially shape the laser excitation light into a geometric pattern comprising at least one enclosed line shape for generating focused acoustic waves.

The geometric pattern may comprise a plurality of enclosed line shapes, and a gap between adjacent enclosed line shapes may be selected based on a wavelength of the acoustic waves to be generated.

The at least one enclosed line shape may comprise one of a group consisting of a circle, a polygon, and an oval.

The excitation light source may be configured to spatially shape the laser excitation light into a geometric pattern comprising a dotted line, the dotted line being selected from a group consisting of a dotted straight line, a dotted curved line, and a dotted enclosed line shape.

The excitation light source may be further configured to project the laser excitation light onto a plurality of locations on the surface of the test object and the shearography imaging system may be further configured to determine the presence of a defect in a corresponding plurality of regions of the test object.

The excitation light source may comprise at least one pulsed laser, and a pulse duration of the at least one pulsed laser may be selected based on a material of the test object and/or a frequency of the acoustic waves.

The excitation light source may comprise a plurality of pulsed lasers, and the plurality of pulsed lasers may be temporally synchronized to emit simultaneously.

The excitation light source may comprise a plurality of pulsed lasers, and the plurality of pulsed lasers may be temporally controlled to emit sequentially based on predetermined time delays.

The shearography imaging system may comprise:

an illumination light source configured to illuminate a region on the surface of test object with laser illumination light; and an image sensor configured to record, for each loading state, a respective interferometric speckle pattern generated by reflected laser illumination light.

BRIEF DESCRIPTION OF THE DRAWINGS

Embodiments of the disclosure will be better understood and readily apparent to one of ordinary skill in the art from the following written description, by way of example only, and in conjunction with the drawings, in which.

Figure 1:
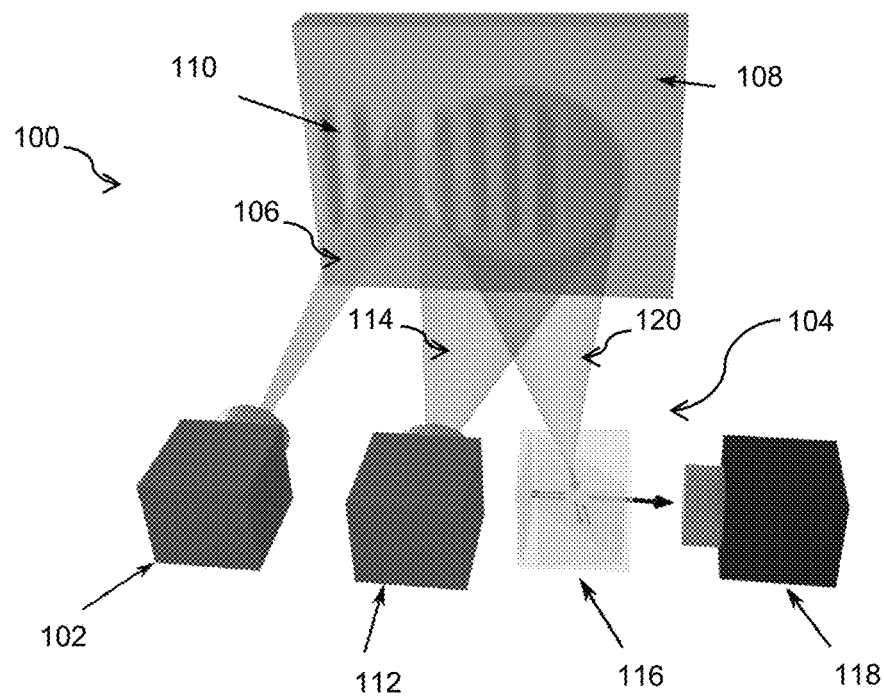
FIG. 1 shows a schematic diagram of a non-contact non-destructive testing system according to an example embodiment.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

In shearography testing, a coherent laser is used to illuminate the surface of a test object, and the reflected light generates an interferometric speckle pattern to be recorded by an image sensor, such as a charge-coupled device (CCD) sensor. The interferometric speckle pattern is further processed by a shearing device which coherently combines two identical but laterally displaced speckle patterns. Two of such interferometric speckle patterns are recorded at different loaded states, namely unloaded and loaded states. The difference of the two interferometric speckle patterns recorded at different loaded states of the test object results in a shearography image or shearogram, which is directly correlated to the deformation anomalies induced by defects in response to the applied loading. The shearography image contains information of the defects in test objects, including delamination, fatigue, corrosions and cracks, etc.

The inventors in the present disclosure recognise both the low amplitude and limited coverage area/depth of laser-induced acoustic waves using a point-source pulsed laser which is commonly used in conventional laser ultrasound, and the low displacement sensitivity of shearography imaging. The inventors also recognize that there is a gap between the amplitude of laser-induced acoustic waves and the minimum wave amplitude required for shearography imaging. For example, the typical amplitude of a laser-induced acoustic wave is in the order of 0.01-1 nm and the minimum wave amplitude required by shearography is more than 10 nm. In addition, the amplitude of the point-source pulsed laser induced acoustic wave decreases exponentially as the acoustic wave radiates away in all directions. Hence, even if the acoustic wave is strong enough at the point of excitation, it will not be able to cover a sizeable imaging area and sufficient depth.

The present disclosure provides a number of laser acoustic excitation designs by spatially and/or temporally controlling a laser excitation light based on a predetermined pattern to excite focus/directional acoustic waves to cover a sizeable area for shearography imaging. In example embodiments, patterned pulsed laser excitation light with different designs are disclosed to greatly improve the signal strength and imaging sensitivity for shearography testing. These designs include, but are not limited to, a line laser that generates directional acoustic waves in the region of interest, a curved line laser that generates focused acoustic waves to enhance sensitivity, multiple pulsed lasers with time delay between each laser excitation to produce steerable acoustic waves with different focus depth, and patterned pulse lasers of different pre-defined areas to be excited simultaneously or with a time sequence to improve the energy density of acoustic waves.

As described in further details below, in example embodiments, a non-contact laser acoustic shearography system with patterned pulsed laser as loading source is used. The non-contact laser acoustic shearography system is capable of performing fast and full-field imaging of defects in the test object without the requirement of physical contact. The patterned pulsed laser functions as excitation source to produce directional or focused acoustic waves as loading, and a shearography imaging system detects the surface deformation anomalies. The patterned pulsed laser capable of generating steerable and directional acoustic waves in the test object is formed by projecting one or a plurality of line lasers on the surface of the test object at selected areas. Curved line pulsed laser can also be projected on the surface of test object to generate focused acoustic waves for enhanced defect detection sensitivity. Alternatively, multiple pulsed lasers can be projected on the surface of test object, forming a dotted line pattern as excitation source. The multiple pulsed lasers in the form of point or line can also be projected in sequence with time delay between the pulsed lasers, on the same location or forming a pattern on the test object, to generate the directional, or focused acoustic waves.

Embodiments will be described, by way of example only, with reference to the drawings. Like reference numerals and characters in the drawings refer to like elements or equivalents.

FIG. 1 shows a schematic diagram of a non-contact non-destructive testing (NDT) system 100 according to an example embodiment. The NDT system 100 includes an excitation light source 102 and a shearography imaging system 104. The excitation light source 102 is configured to spatially and/or temporally control a laser excitation light 106 based on a predetermined pattern, and project the laser excitation light 106 onto a surface of a test object 108 to generate acoustic waves 110 on the test object 108 to thereby apply stress loading to the test object 108. The shearography imaging system 104 is configured to image the test object 108 with and without stress loading, and analyze shearography imaging data to determine a presence of a defect in the test object 108.

In this embodiment, the laser excitation light 106 projected on the test object 108 is in the shape of a straight line with a short pulse duration. The duration of the pulse is selected to be small enough to induce thermal acoustic waves in the test object instead of generating heat deformation when the pulse duration is too long. The preferred range of the pulse duration is dependent on the thermal properties of the testing materials and/or the desired frequency of the induced acoustic waves. For example, a typical pulse duration is less than tens of nanoseconds (ns) for metallic materials and less than 100 ns for composite materials. If ablation of a thin layer of surface material in the test object 108 is allowed, a high-power pulsed laser can be used to generate strong acoustic waves via the ablation of surface material. The laser excitation light 106 in the form of a pulsed line laser induces directional acoustic waves in the test object 108, with the propagation direction being substantially perpendicular to the longitudinal axis of the line laser. In some implementations, the projection of the line laser on surface of test object 108 can be rotated to generate steerable directional acoustic waves.

The line pulsed laser induces the acoustic waves 110 in the test object 108, and the deformation anomalies are detected by the shearography system 104. As shown in FIG. 1, the shearography imaging system 104 includes an illumination light source 112 capable of generating a coherent laser as illumination laser 114, an optical system comprising a Michelson interferometer 116, and an image sensor in the form of a CCD camera 118. The image sensor is configured to record, for each loading state (i.e. loaded and unloaded states), a respective interferometric speckle pattern generated by reflected laser illumination light 120. A processing device (not shown) coupled to the image sensor analyses the data from the image sensor in accordance with shearography to determine the presence of a defect in the object 108 including location of the defect.

Figure 2:
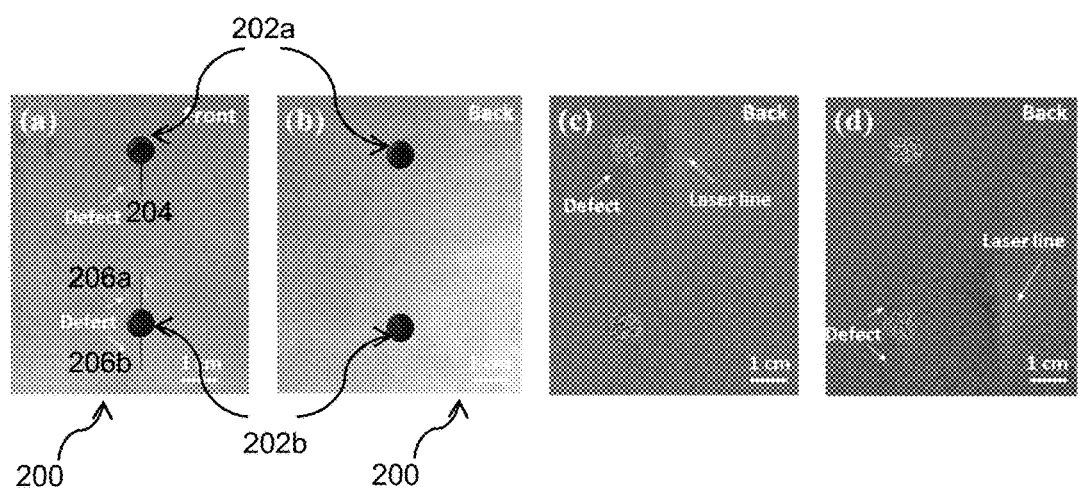
FIGS. 2(a) and 2(b) show the front and back side of a test object respectively.
FIGS. 2(c) and 2(d) show shearography images of the back side of the test object of FIGS. 2(a) and 2(b) using the system of FIG. 1.

The NDT system 100 of FIG. 1 has been applied to detect defects in a physical sample. FIGS. 2(a) and 2(b) show the front and back side of a test object 200, respectively. FIGS. 2(c) and 2(d) show shearography images of the back side of the test object 200 of FIGS. 2(a) and 2(b) using the NDT system 100 of FIG. 1.

The test object 200 in this example is an aluminium plate with a thickness of 6 mm, and two holes 202a, 202b of approximately 8 mm in diameter. The top hole 202a has one defect 204 in the form of a notch with approximately 10 mm in length, and the bottom hole 202b has two defects 206a, 206b in the form of two notches with approximately 10 mm in length, as shown in FIG. 2(a). The defects 204, 206a, 206b are visible from the front side of the aluminium plate, but not visible from the back side in FIG. 2(b).

The aluminium plate is tested from the back side where the notches are invisible. First, a shearography image of the unloaded state is taken when the excitation laser is not irradiating. Then the excitation laser projects a pulsed line laser with length of the line around 40 mm onto a selected location on the surface of the aluminium plate. The excitation laser is pulsed at a frequency of 10 Hz, with the pulse duration shorter than 10 ns, during the shearography test to obtain the loaded state shearography image of the test object 200. The entire acquisition process can be completed in several seconds. As shown in FIGS. 2(c) and 2(d), the defects 204, 206a, 206b (notches) are clearly observed from the back side.

Figure 3:
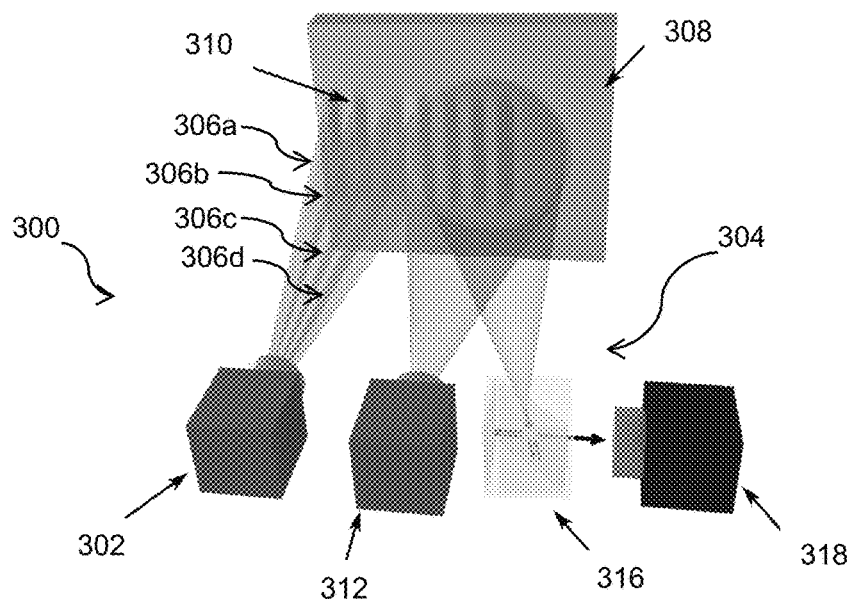
FIG. 3 shows a schematic diagram of a non-contact non-destructive testing system according to another example embodiment.

FIG. 3 shows a schematic diagram of a non-contact non-destructive testing (NDT) system 300 according to another example embodiment. Similar to the embodiment shown in FIG. 1, the NDT system 300 includes an excitation light source 302 and a shearography imaging system 304 which includes an illumination light source 312, an optical system comprising a Michelson interferometer 316, and an image sensor in the form of a CCD camera 318.

In this embodiment, the excitation light source 302 is configured to spatially shape the laser excitation light into a geometric pattern comprising a plurality of continuous straight lines. For example, multiple pulsed lasers 306a-d are projected on the test object 308 forming multiple straight lines as shown in FIG. 3. The interval or gap between the straight lines is determined by the intended wavelength of the induced acoustic waves 310 in the test object 308. The projection of multiple line lasers with interval matching the wavelength of the induced acoustic waves 310 can increase the intensity and propagation directionality of the acoustic waves 310. The multiple pulsed lasers 306a-d can be projected onto the test object 306 simultaneously or with time delays between the pulsed lasers. In alternate embodiments, instead of straight lines, multiple curved lines or a selected pattern can be projected on the test object to induce the acoustic waves.

Figure 4:
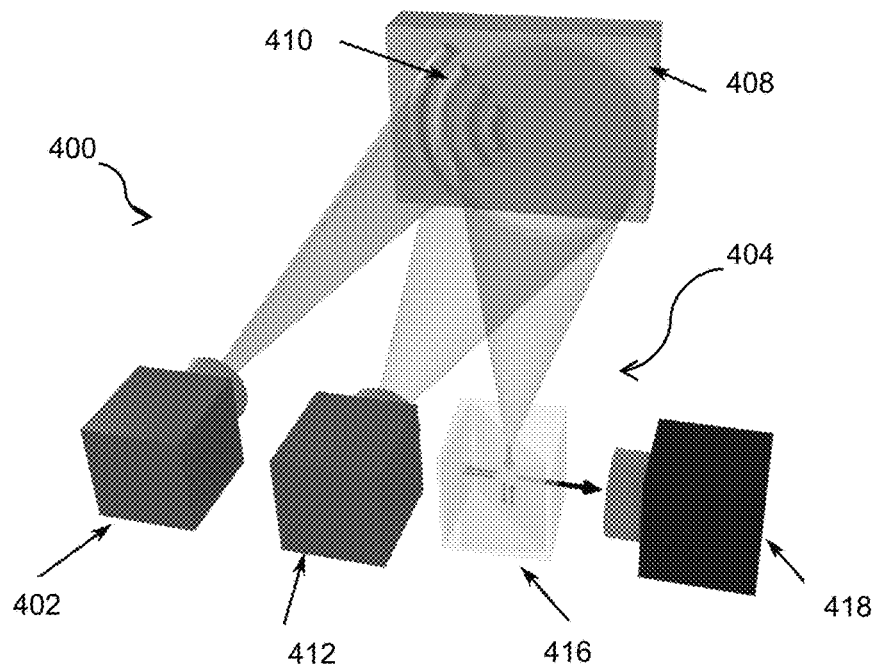
FIG. 4 shows a schematic diagram of a non-contact non-destructive testing system according to another example embodiment.

FIG. 4 shows a schematic diagram of a non-contact non-destructive testing (NDT) system 400 according to another example embodiment. Similar to the embodiment shown in FIG. 1, the NDT system 400 includes an excitation light source 402 and a shearography imaging system 404 which includes an illumination light source 412, an optical system comprising a Michelson interferometer 416, and an image sensor in the form of a CCD camera 418.

In this embodiment, the excitation light source 402 is configured to spatially shape the laser excitation light 406 into a geometric pattern having at least one continuous curved line for generating focused acoustic waves 410, and a focus point of the acoustic waves 410 coincides with the focus point of a curvature of the at least one continuous curved line. FIG. 4 shows the curved line projection of a pulsed laser excitation light 406 on the test object 408, with the focus point of the acoustic waves 410 coincides with the focus point of the curvature of the projected pulsed laser excitation light 406. Focused acoustic waves can lead to a higher signal-to-noise ratio for defect detection due to the stronger acoustic intensity at the focus point.

In alternate embodiments, the geometric pattern includes a plurality of curved lines, and a gap between adjacent curved lines is selected based on a wavelength of the acoustic waves to be generated. For example, a plurality of pulsed lasers are used to generate the plurality of curved lines, and the pulsed lasers can be temporally controlled to emit simultaneously or sequentially based on pre-determined time delays.

Figure 5:
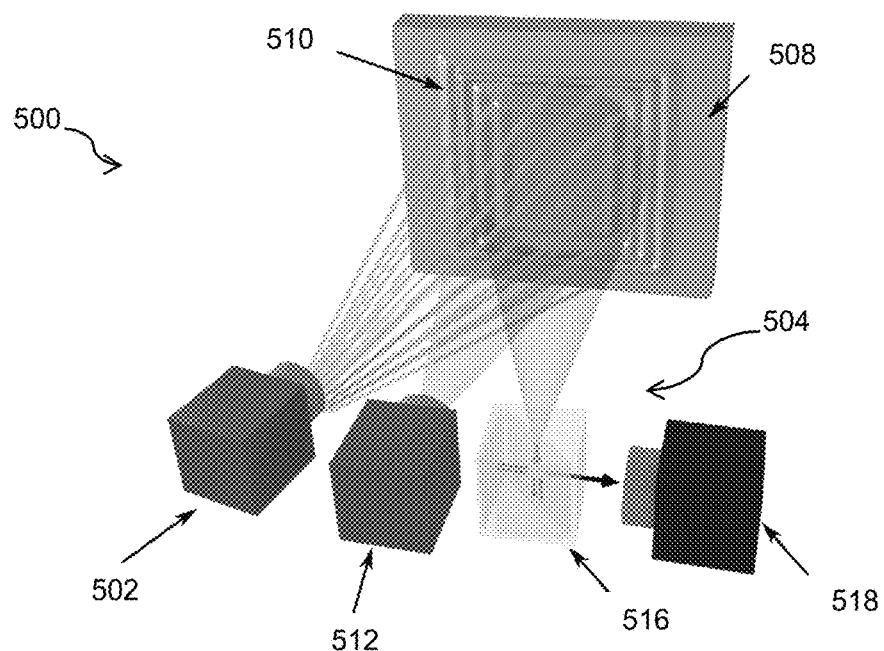
FIG. 5 shows a schematic diagram of a non-contact non-destructive testing system according to another example embodiment.

FIG. 5 shows a schematic diagram of a non-contact non-destructive testing (NDT) system 500 according to another example embodiment. Similar to the embodiment shown in FIG. 1, the NDT system 500 includes an excitation light source 502 and a shearography imaging system 504 which includes an illumination light source 512, an optical system comprising a Michelson interferometer 516, and an image sensor in the form of a CCD camera 518.

In this embodiment, the excitation light source 502 is configured to spatially shape the laser excitation light into a geometric pattern having at least one enclosed line shape for generating focused acoustic waves 510. For example, multiple pulsed lasers are projected on the test object 508 to form one or multiple enclosed line shapes as shown in FIG. 5. The enclosed line shapes of pulsed laser patterns are useful for focusing the acoustic waves 510 within the enclosed line shapes for enhanced acoustic wave intensity. The enclosed line shapes can be any regular shapes, such as rectangles, circles, or polygons, or irregular but enclosed shapes. In instances where multiple enclosed line shapes are used, a gap between adjacent enclosed line shapes is selected based on a wavelength of the acoustic waves to be generated. Further, the pulsed lasers can be temporally controlled to emit simultaneously or sequentially based on pre-determined time delays.

Figure 6:
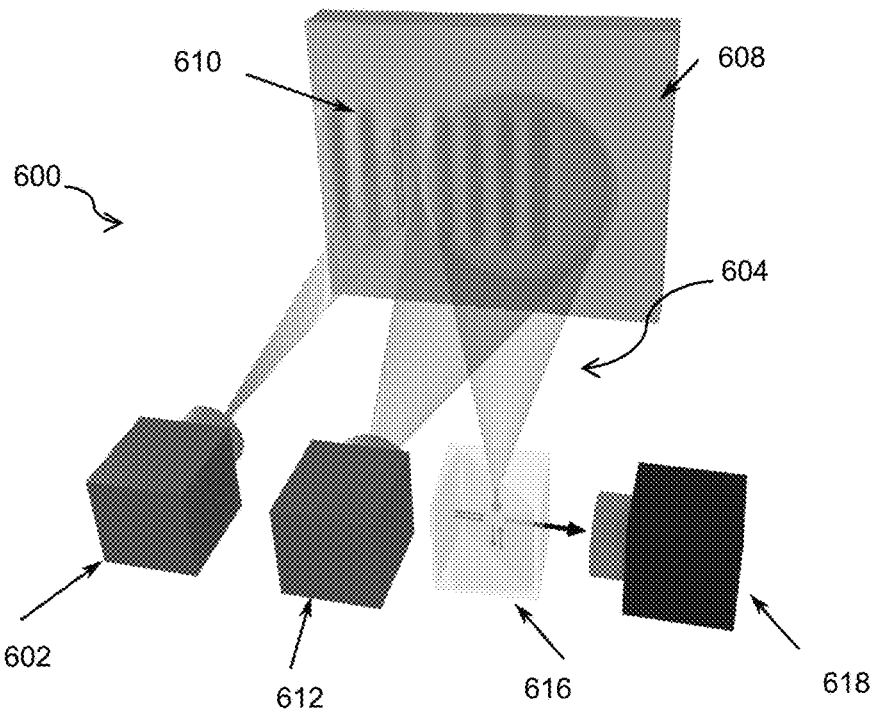
FIG. 6 shows a schematic diagram of a non-contact non-destructive testing system according to another example embodiment.

FIG. 6 shows a schematic diagram of a non-contact non-destructive testing (NDT) system 600 according to another example embodiment. Similar to the embodiment shown in FIG. 1, the NDT system 600 includes an excitation light source 602 and a shearography imaging system 604 which includes an illumination light source 612, an optical system comprising a Michelson interferometer 616, and an image sensor in the form of a CCD camera 618.

In this embodiment, the excitation light source 602 is configured to spatially shape the laser excitation light into a geometric pattern comprising a dotted line. For example, multiple pulsed lasers are used as excitation source to project a dotted pattern on the test object 608 to produce acoustic waves 610. The multiple pulsed lasers forming a laser array may be synchronized to irradiate on the test object simultaneously forming a straight dotted line as shown in FIG. 6. The projection of multiple pulsed lasers can form a straight dotted line on the test object to induced directional acoustic waves. The induced directional acoustic waves propagate in the direction perpendicular to the long axis of the dotted line laser. Alternatively, the projection of multiple pulsed lasers can be shaped to form a curved dotted line on the test object to induce focused acoustic waves. The projection of multiple pulsed lasers can also be shaped to form another pattern, e.g. a dotted enclosed line shape, on the test object. In other words, the dotted line can be selected from a group consisting of a dotted straight line, a dotted curved line, and a dotted enclosed line shape.

Figure 7:
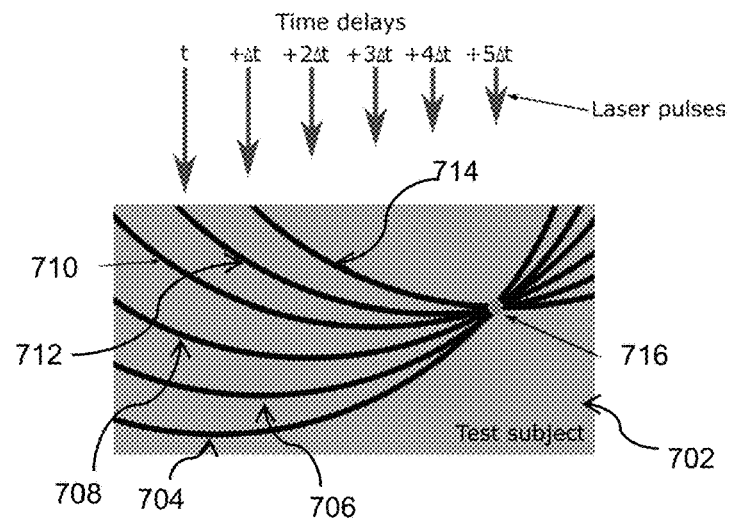
FIG. 7 shows a schematic diagram illustrating acoustic focusing capability of multiple delayed pulsed lasers according to an example embodiment.

As a variation to the embodiment shown in FIG. 6, the multiple pulsed lasers can be individually projected on the test object at different time and location. Directional and focused acoustic wave can be produced by controlling the time delays between each laser pulses and the geometrical shape of the laser projection. FIG. 7 shows a schematic diagram illustrating acoustic focusing capability of multiple delayed pulsed lasers according to an example embodiment. Here, multiple pulsed lasers are sequentially projected onto the test object 702 with a time delay Δt between consecutive pulses, and the corresponding acoustic waves 704, 706, 708, 710, 712, 714 intersect or converge at a focus point 716. The focus point 716 can be controlled electronically by adjusting the time delays between the pulsed lasers, allowing large area inspection without mechanically moving the excitation lasers.

Figure 8:
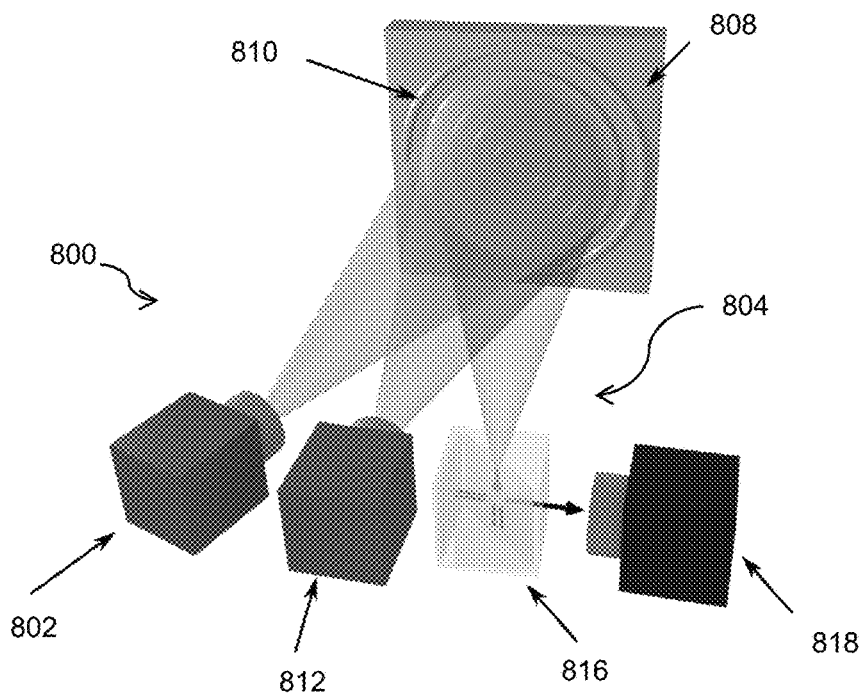
FIG. 8 shows a schematic diagram of a non-contact non-destructive testing system according to another example embodiment.

FIG. 8 shows a schematic diagram of a non-contact non-destructive testing (NDT) system 800 according to another example embodiment. Similar to the embodiment shown in FIG. 1, the NDT system 800 includes an excitation light source 802 and a shearography imaging system 804 which includes an illumination light source 812, an optical system comprising a Michelson interferometer 816, and an image sensor in the form of a CCD camera 818.

In this embodiment, the excitation light source 802 includes patterned pulsed lasers which are projected over one or multiple pre-defined areas on the test object 808 to induce acoustic waves 810 in the test object 808 as shown in FIG. 8. The patterned pulse lasers projected to these pre-defined areas can be excited simultaneously or with a pre-defined time sequence. The illumination light source 812 and the field-of-view of the CCD camera 818 in the shearography imaging system 804 are to cover all the pre-defined areas where patterned pulsed lasers are projected, so that the defects at different locations can be detected simultaneously or sequentially.

Figure 9:
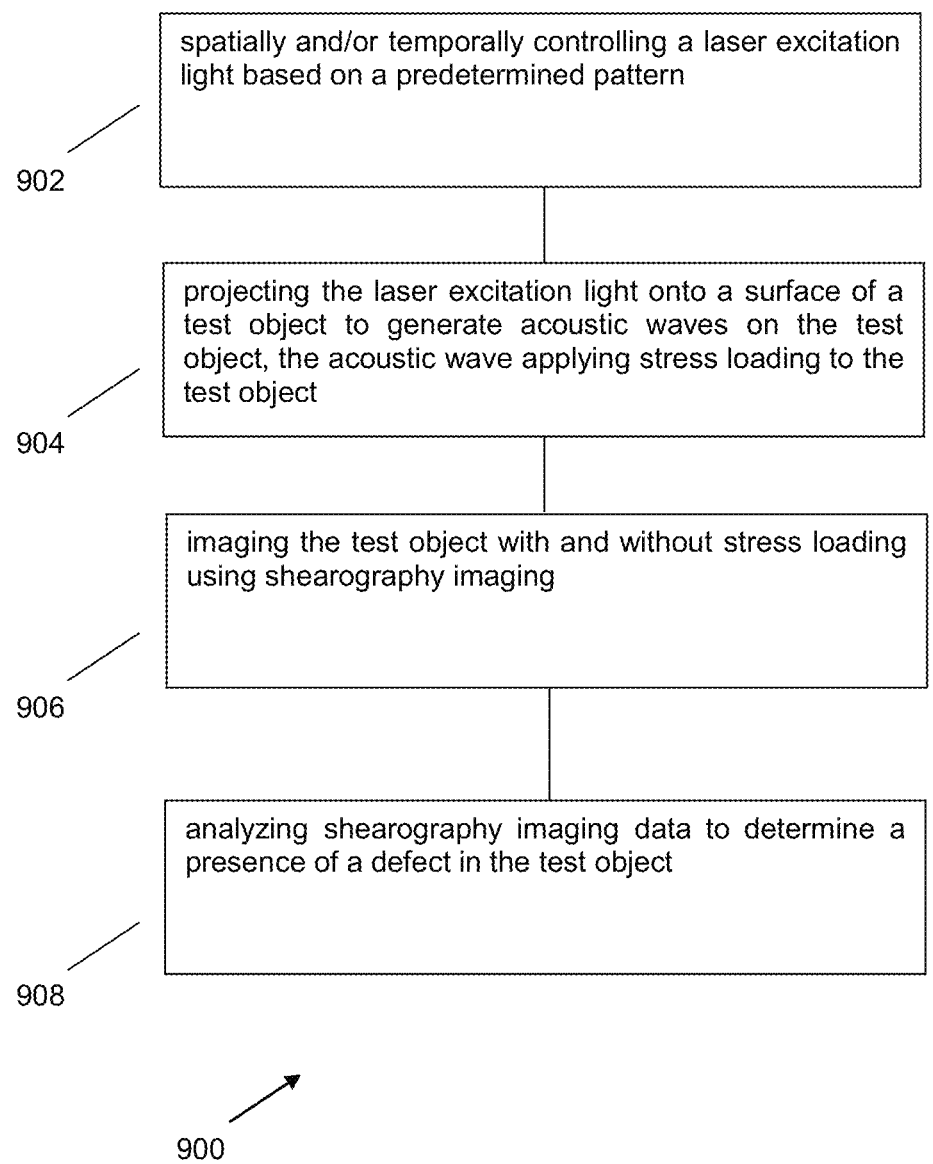
FIG. 9 shows a flow chart illustrating a non-contact non-destructive testing method according to an example embodiment.

FIG. 9 shows a flow chart illustrating a non-contact non-destructive testing method according to an example embodiment. At step 902, a laser excitation light is spatially and/or temporally controlled based on a predetermined pattern. At step 904, the laser excitation light is projected onto a surface of a test object to generate acoustic waves on the test object, the acoustic wave applying stress loading to the test object. At step 906, the test object is imaged with and without stress loading using shearography imaging. At step 908, shearography imaging data is analyzed to determine a presence of a defect in the test object.

As described, the use of patterned pulsed lasers for non-contact non-destructive testing in the example embodiments enable focused and strong ultrasound waves for successful shearography detection, detection of deep subsurface defects, and full-field, non-contact, non-destructive imaging of multiple areas of interests simultaneously. For example, it has been demonstrated that the non-contact and full-field imaging in the example embodiments is suitable for large area inspection in the m$^2$ range, with fast detection in seconds. Detection of defect at a depth of approximately 6 mm in metals has been demonstrated. Furthermore, there are no limits on the types of materials to be tested (i.e. suitable for metals, composites, ceramics, etc.) or the types of defects (i.e. cracks, voids, delamination, etc. are detectable). The present method and system are also applicable for NDT of high-temperature or contact-restricted (e.g. complex-shaped) structures or materials. Some practical applications include NDT over large area for aircraft, marine and offshore structures and general infrastructures, an in-service inspection of materials and parts where contact measurement is not possible, e.g. high temperature components.

It will be appreciated by a person skilled in the art that numerous variations and/or modifications may be made to the present disclosure as shown in the specific embodiments without departing from the scope of the disclosure as broadly described. For example, parameters such as shape, pulse duration, power of the laser excitation light can be adjusted based on the practical requirements, e.g. material, size and shape of the test object. The present embodiments are, therefore, to be considered in all respects to be illustrative and not restrictive.

The invention claimed is:

1. A non-contact non-destructive testing method comprising:
spatially and temporally controlling a laser excitation light based on a predetermined pattern, the laser excitation light being generated from a plurality of pulsed lasers, wherein spatially controlling the laser excitation light comprises shaping the laser excitation light into a geometric pattern comprising at least one continuous curved line for generating focused acoustic waves, and wherein a focus point of the acoustic waves coincides with the focus point of a curvature of the at least one continuous curved line, and wherein the geometric pattern comprises a plurality of curved lines, and wherein a gap between adjacent curved lines is selected based on a wavelength of the acoustic waves to be generated;

projecting the laser excitation light onto a surface of a test object to generate acoustic waves on the test object, the acoustic waves applying stress loading to the test object;

imaging said surface of the test object with and without stress loading using shearography imaging; and analyzing shearography imaging data to determine a presence of a defect in the test object.

2. The method as claimed in claim 1, wherein spatially controlling the laser excitation light comprises shaping the laser excitation light into a geometric pattern comprising at least one continuous straight line for generating directional acoustic waves.

3. The method as claimed in claim 2, further comprising rotating the at least one continuous straight line to steer the acoustic waves.

4. The method as claimed in claim 2, wherein the geometric pattern comprises a plurality of straight lines, and wherein a gap between adjacent straight lines is selected based on a wavelength of the acoustic waves to be generated.

5. The method as claimed in claim 1, wherein spatially controlling the laser excitation light comprises shaping the laser excitation light into a geometric pattern comprising at least one enclosed line shape for generating focused acoustic waves.

6. The method as claimed in claim 5, wherein the geometric pattern comprises a plurality of enclosed line shapes, and wherein a gap between adjacent enclosed line shapes is selected based on a wavelength of the acoustic waves to be generated.

7. The method as claimed in claim 1, wherein spatially controlling the laser excitation light comprises shaping the laser excitation light into a geometric pattern comprising a dotted line, the dotted line being selected from the group consisting of a dotted straight line, a dotted curved line, and a dotted enclosed line shape.

8. The method as claimed in claim 1, further comprising projecting the laser excitation light onto a plurality of locations on the surface of the test object and determining the presence of a defect in a corresponding plurality of regions of the test object.

9. The method as claimed in claim 1, wherein temporally controlling the laser excitation light comprises selecting a pulse duration of the pulsed lasers based on a material of the test object and/or a frequency of the acoustic waves.

10. The method as claimed in claim 9, wherein temporally controlling the laser excitation light further comprises synchronizing the plurality of pulsed lasers to emit simultaneously.

11. The method as claimed in claim 9, wherein temporally controlling the laser excitation light further comprises controlling the plurality of pulsed lasers to emit sequentially based on predetermined time delays.

12. The method as claimed in claim 1, wherein imaging the test object comprises:

illuminating a region on the surface of test object with a laser illumination light;

for each loading state, recording a respective interferometric speckle pattern generated by reflected laser illumination light using an image sensor.

* * * * *